United States Patent Office 3,297,146
Patented Jan. 10, 1967

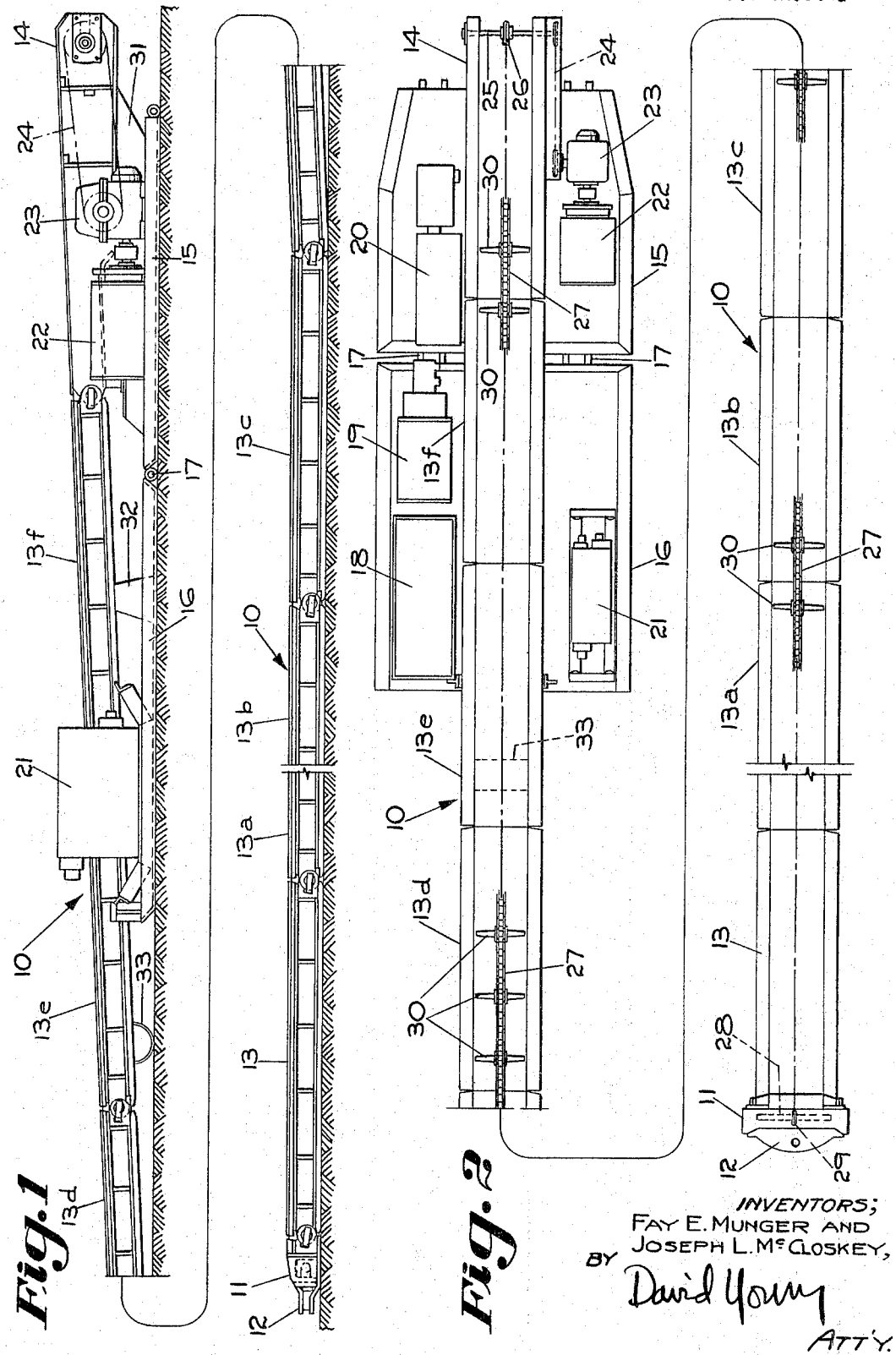

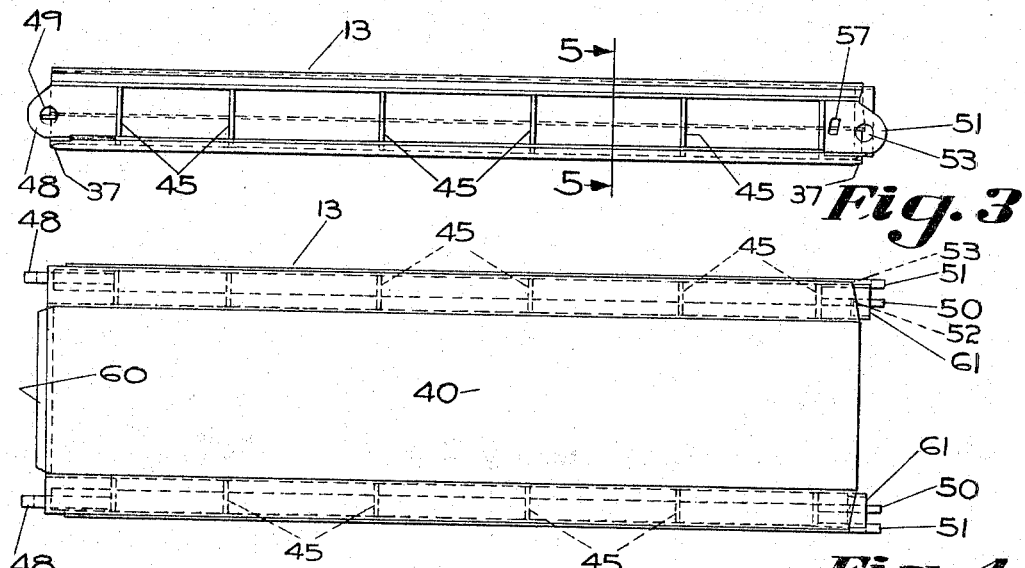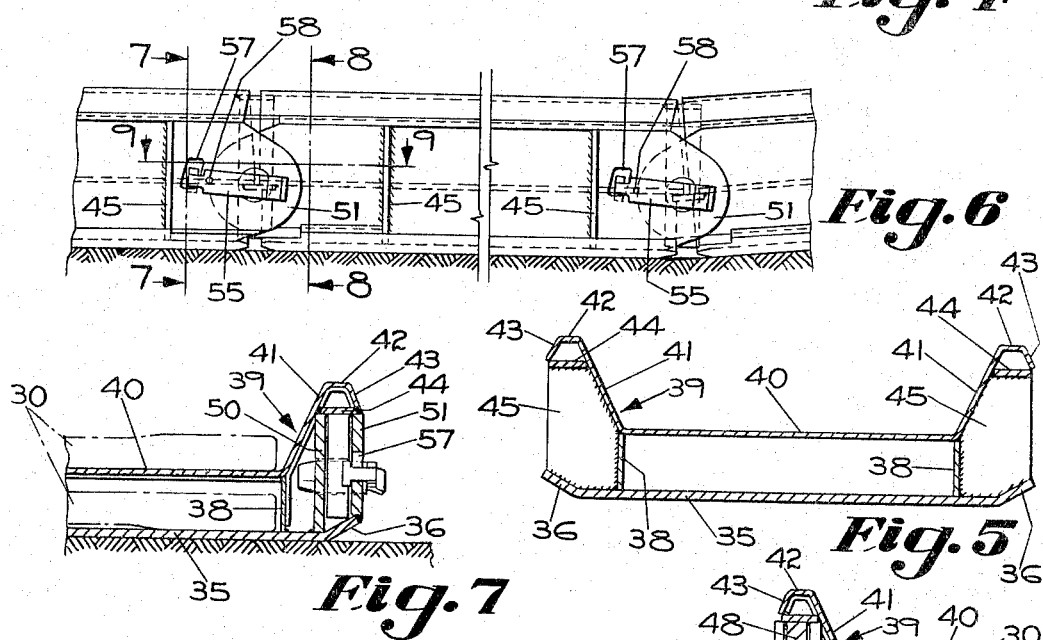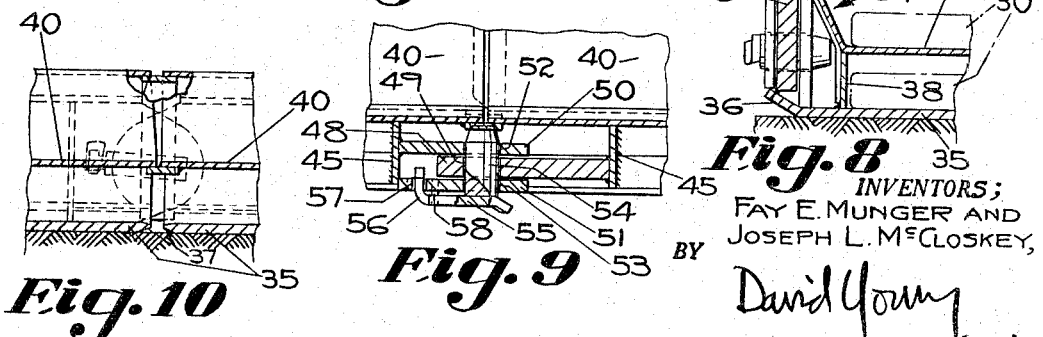

3,297,146
PAN CONVEYOR
Fay E. Munger and Joseph L. McCloskey, Columbus, Ohio, assignors to Jeffrey Galion Manufacturing Company, a corporation of Ohio
Filed Feb. 14, 1964, Ser. No. 344,956
10 Claims. (Cl. 198—204)

The instant invention relates to pan conveyors of the type that are particularly adapted for use in underground coal mining operations.

It is an object of the instant invention to provide an improved pan conveyor construction which is of simple construction and has great strength and rigidity.

It is another object of the instant invention to provide an improved pan conveyor construction in which the pan sections may be quickly and easily connected and disconnected one to another.

It is a further object of the instant invention to provide an improved pan conveyor construction in which the several conveyor sections can bend relatively to each other so as to conform to an uneven supporting surface on which such conveyor may be supported.

It is still another object of the instant invention to provide an improved pan conveyor construction in which the conveyor comprising several sections joined to each other is sufficiently rigid that it may be swung laterally of the line of the conveyor.

Still another object of the instant invention is to provide an improved pan conveyor construction having great strength and rigidity, and yet being of low height.

Other objects of the instant invention will appear hereinafter, the novel features and combinations being set forth in the appended claims.

In the drawings:

FIG. 1 is a side elevational view of a pan conveyor embodying the instant invention;

FIG. 2 is a plan view on a reduced scale of the pan conveyor illustrated in FIG 1;

FIG. 3 is a side-elevational view of a typical intermediate pan conveyor section;

FIG. 4 is a plan view of the intermediate pan conveyor section;

FIG. 5 is a sectional view, on a larger scale, of the intermediate pan conveyor section, taken on the line 5—5 in FIG. 3;

FIG. 6 is a side elevational view showing the connection of successive pan conveyor sections to each other;

FIG. 7 is a partial sectional view of the pan conveyor, taken on the line 7—7 in FIG. 6;

FIG. 8 is a partial sectional view of the pan conveyor, taken on the line 8—8 in FIG. 6;

FIG. 9 is a partial sectional view of the pan conveyor, taken on the line 9—9 in FIG. 7; and FIG. 10 is a partial longitudinal sectional view of the joint between adjacent pan conveyor sections.

Referring to the drawings, there is illustrated in FIGS. 1 and 2 a pan conveyor 10, also referred to as a pan line, of a type particularly adapted for use in underground coal mining operations. It is particularly required that such conveyor be of a sturdy construction to withstand the abuse and hard handling to which coal mining equipment is customarily subjected. It is a further important feature that such conveyor be of a low overall height, to be suitable for use in low height coal seams.

The pan conveyor 10 has a tail section 11 at the tail end thereof, this being the end of the conveyor 10 at which the material is usually delivered to the conveyor, although it will be understood that material may be delivered to the conveyor at other points along the length thereof. The tail section 11 includes a tow bar 12 by which the conveyor may be towed to another operating position.

An intermediate pan conveyor section 13 is connected to the tail section, and additional intermediate pan conveyor sections 13a–f are successively connected in line with the first intermediate pan conveyor section 13, to make up the full length of the pan conveyor 10. The number of intermediate pan conveyor sections 13 is determined by the desired length of the pan conveyor 10.

The last intermediate pan conveyor section 13f is connected to a head section 14, from which the material is discharged. The head section 14 is elevated so that a suitable apparatus may be placed under the head section 14 for receiving the material therefrom.

At the head end of the pan conveyor 10 there is provided a first supporting base member 15 and a second supporting base member 16. The supporting base members 15, 16 are connected to each other by hinges 17, 17 which permit the supporting base members 15, 16 to bend relatively to each other in conformance with an uneven surface on which they may be placed. Each of the supporting base members 15, 16 extends laterally beyond the opposite sides of the conveyor 10 to provide a supporting platform for various operating or control elements for the mining apparatus. By way of example, these elements may include a tank 18 for hydraulic oil, a combined motor and hydraulic pump 19, electrical controllers 20, 21, and other such apparatus as is associated with the mining equipment. The supporting base member 15 also supports a motor 22 from which power is supplied to a transmission 23 to operate a chain and sprocket drive 24.

At the end of the head section 14 there is a transverse drive shaft 25 which is driven by the chain and sprocket drive 24. A drive sprocket 26 is secured to the drive shaft 25, and is centrally disposed. The conveying device of the pan conveyor 10 preferably comprises an endless chain 27 which is engaged with drive sprocket 26 to be driven thereby in a conveying run and in a return run. The tail section 11 includes a transversely disposed rotatable shaft 28 which has a sprocket or wheel 29 that is centrally disposed. The shaft 28 and the sprocket or wheel 29 are rotatably supported in the tail section 11, and perform a guiding function for the chain 27 as it moves from its return run to its conveying run. A plurality of transversely extending flights 30 are secured to the chain 27 at longitudinally spaced positions. The flights 30 extend in opposite directions from the chain 27, and are moved along the pan conveyor 10 by the chain 27 to engage the material and to move it along the conveyor 10, thereby achieving the conveying function.

The head section 14 is fixedly secured to the first supporting base member 15 on a suitable stand 31 which elevates the head section 14 for discharging material. The intermediate pan conveyor section 13f is connected to the head section 14 and is supported by a suitable pedestal 32 on the second supporting base member 16. The intermediate pan conveyor section 13e is in turn connected to the conveyor section 13f and has a skid type support 33 secured to the underside thereof, by which it is supported.

As seen in FIG. 1, the head section 14 and the intermediate conveyor sections 13e, 13f are disposed at a descending angle from the head end of the conveyor 10. The intermediate conveyor section 13d is connected to the intermediate conveyor section 13e and is also disposed at a descending angle, with this section reaching the supporting surface. All of the other conveyor sections beyond the intermediate section 13d are placed directly on the supporting surface. All the conveyor sections are connected to each other by like means that permits the sections to bend relatively to each other to provide longitudinal flexibility of the pan conveyor 10 to permit it to conform to any irregularities of the supporting surface.

Referring to FIGS. 3, 4 and 5, there is illustrated therein a typical intermediate pan conveyor section 13, which is adapted to be connected to the tail section 11, to the head section 14 and to other like intermediate conveyor sections 13, to make up the full length of the conveyor 10. The conveyor section 13 is formed of metal plate material, such as is commonly available. The plate members of the pan conveyor section 13 are assembled and secured to each other by welding, which contributes to the overall strength of the unit.

The conveyor section 13 has a base plate member 35, which is formed of a plate of substantial thickness. The base member 35, in effect, serves as a frame for the remaining members of the conveyor section 13 that are assembled thereon, as well as being a base support. The base member 35 extends the full length of the conveyor section 13. The opposite side portions 36, 36 of the base member 35 are turned up at an angle to facilitate skidding the conveyor section 13 laterally. Similarly, the opposite end edges 37, 37 of the base member 35 are beveled, also to facilitate skidding the section 13.

A pair of all plate members 38, 38 are secured to the base plate member 35 in upright positions, and are laterally spaced on the base member 35. The wall members 38, 38 extend longitudinally of the pan conveyor section 13 for substantially the full length thereof.

A pan plate member 39 is secured to the tops of the upright wall plate members 38. The pan member 39 comprises a bed 40 which lies flat across the tops of the upright wall members 38. The pan member 39 further includes opposite sides 41, 41, each of which extends laterally and upwardly, at an angle, from the bed 40 to provide a pan configuration, within which material is received. At each side of the conveyor section 13, the pan member 39 has a rail 42 that extends laterally outwardly from the top of each side 41, and a down turned flange 43, which extends downwardly and outwardly, at an angle, from the rail 42. The pan plate member 39 as thus described extends longitudinally of the conveyor section 13 for substantially the full length thereof.

The base member 35, the upright wall members 38, and the bed 40 of the pan member 39 together form a longitudinally extending compartment of a box-like configuration for the return run of the conveying device 27, 30. This box-like construction also contributes materially to the strength and rigidity of the conveyor construction.

Below each rail 42 there is provided a reinforcing plate strip 44 that is laterally disposed, and is substantially parallel to the rail 42 and spaced below the latter. The reinforcing strip 44 is secured to the lower edge of the downwardly directed flange 43 and to the side 41. The reinforcing strip 44 extends substantially the full length of the conveyor section, in the same manner as the pan member 39.

The conveyor section 13 is further rigidified by a plurality of upright gusset plate members 45, of which there may be six on each side of the conveyor section 13, as seen in FIGS. 3 and 4. Each gusset 45 is disposed in the area between the portion of the base member 35 that extends laterally beyond a wall member 38, a side 41 of the pan member 39, and a reinforcing strip 44, and is secured to these elements. The gussets 45 particularly strengthen the sides 41 of the pan member 39 and support the rails 42. The rails 42 are adapted to support the carriage of a bridge conveyor that rides along the rails 42 to deliver material to the pan conveyor 10.

At the left end of the conveyor section 13, as viewed in FIGS. 3 and 4, there is a pair of lugs 48, projecting beyond the end of the conveyor section 13, and placed one at each side of the conveyor section 13, and being of like construction. As best seen in FIGS. 6, 8 and 9, a lug 48 is disposed between a reinforcing strip 44 and an upturned edge 36 of the base member 35. The inner end of a lug 48 abuts a gusset 45. Each lug 48 is secured to an upturned edge 36, a reinforcing strip 44 and a gusset 45. Each lug 48 has an aperture 49.

At the right end of the conveyor section 13, and at each side thereof, there is provided a pair of laterally spaced lugs, 50, 51, which project beyond the end of the conveyor section 13. As best seen in FIGS. 6, 7 and 9, the inner lug 50 is placed between a reinforcing strip 44 and the base member 35. The outer lug 51 is placed between a reinforcing strip 44 and the upturned edge 36 of the base member 35. Both lugs 50, 51 have their inner ends abutting a gusset 45. Lugs 50, 51 are secured to the base member 35, a reinforcing strip 44 and a gusset 45. The lugs 50, 51 are formed with apertures 52, 53, respectively, which are in transverse alignment.

The conveyor section 13 is adapted to be assembled with other like conveyor sections, by abutting the end of one conveyor section 13 against another, with each lug 48 at one end of a conveyor section 13 fitting between a pair of lugs 50, 51 at the adjacent end of an adjoining conveyor section 13. The lugs 48, 50, 51 overlap each other and the apertures 49, 52, 53 are aligned to receive a transverse pin 54, to thereby form a hinged connection of one conveyor section 13 to another conveyor section 13. At the outer end of the pin 54 there is secured an arm 55 having a laterally disposed notched end 56. The outer lug 51 has a slot 57 which is adapted to receive the notched end 56. Upon engagement of the notched end 56 of the arm 55 with the slot 57, the pin 54 is effectively secured in the apertures 49, 52, 53. In order to further secure the pin 54, a roll pin 58 is driven in through the arm 55 and the outer lug 51 in apertures provided for the roll pin 58.

The left end of the bed 40 of the pan member 39, as viewed in FIGS. 3 and 4, is provided with a lip 60 projecting from the underside thereof to underlay the bed 40 of the adjoining conveyor section 13. As seen in FIGS. 9 and 10, the beds 40 of adjacent conveyor sections 13 are slightly spaced from each other, and the lip 60 bridges the gap between the adjacent edges of the beds 40.

At the right end of the conveyor section 13, as viewed in FIGS. 3 and 4, there is provided a lip 61 at each side of the conveyor section 13, which is secured to an upright wall member 38, and to the pan member 39, the lip 61 extending adjacent a side 41, a rail 42 and a flange 43. As best seen in FIGS. 6, 9 and 10, the wall members 38 and the pan members 39 of adjoining conveyor sections 13 are spaced from each other, leaving a small gap. The lips 60, 61 bridge this gap. The spacing is provided between the adjacent ends of adjoining conveyor sections, in order to permit the desired degree of bending of one conveyor section relatively to another, for example, as seen in FIG. 6. The lugs 48, 50, 51 and the pins 54, at the opposite sides of the conveyor 10 together form hinged connections of the conveyor sections 13 one to another, and the spacing of the adjacent edges of the conveyor sections 13 permits them to bend as desired, such bending being about the axes of the pins 54.

The tail section 11 and the head section 14 have at least their inner portions constructed in the same manner as described with reference to the intermediate conveyor section 13. Thus, an intermediate conveyor section 13 may be connected to the tail section 11, and likewise, to the head section 14, in the same manner as has been described with reference to the connection of one intermediate conveyor section 13 to another intermediate conveyor section 13. A conveyor 10, constructed as described herein, may quickly be assembled or disassembled, as the case may be, simply by making or breaking the connection of adjacent conveyor sections.

The conveyor construction described herein in simple, but provides the rigidity and ruggedness that is required for this class of equiment. A conveyor constructed in accordance with the invention will withstand the wearing conditions of mining operations. Such conveyor may be towed along its longitudinal line to a new position, and it may also be skidded laterally of its longitudinal line by reason of its high degree of rigidity.

Obviously those skilled in the art may make various changes in the details and arrangement of parts without departing from the spirit and scope of the invention as defined by the claims hereto appended, and applicants therefore wish not to be restricted to the precise construction herein disclosed.

Having thus described and shown an embodiment of the invention, what it is desired to secure by Letters Patent of the United States is:

1. In a pan conveyor section, the construction comprising a rigid base frame member for supporting the conveyor section on a supporting surface and having a substantially planar portion that is coextensive with the pan conveyor section and bears on the supporting surface, separate upright wall members secured to said base member and laterally spaced one from the other, a pan member having a longitudinally extending bed and opposite sides extending upwardly from the bed for the conveying run of an endless conveying device, said pan member being secured to said upright wall members, said base frame member including said substantially planar portion thereof, said separate upright wall members and said pan member including said longitudinally extending bed thereof being secured together in the conveyor construction and forming a longitudinally extending compartment for the return run of an endless conveying device, said base member having opposite side portions thereof extending laterally beyond the upright wall members, said pan member having opposite sides extending upwardly from the bed thereof and laterally outwardly beyond the upright wall members, and reinforcing members disposed between said side portions of the base member and the sides of the pan member.

2. In a pan conveyor section, the construction comprising a rigid base frame member for supporting the conveyor section on a supporting surface and having a substantially planar portion that is coextensive with the pan conveyor section and bears on the supporting surface, separate upright wall members secured to said base member and laterally spaced one from the other, a pan member having a longitudinally extending bed and opposite sides extending upwardly from the bed for the conveying run of an endless conveying device, said pan member being secured to said upright wall members, said base frame member including said substantially planar portion thereof, said separate upright wall members and said pan member including said longitudinally extending bed thereof being secured together in the conveyor construction and forming a longitudinally extending compartment for the return run of an endless conveying device, said base member having opposite side portions thereof extending laterally beyond the upright wall members, said pan member having opposite sides extending upwardly from the bed thereof and laterally outwardly beyond the upright wall members, longitudinally projectant lugs at opposite ends of the pan conveyor construction for connecting it to a like pan conveyor construction, said lugs being disposed between said side portions of the base member and said sides of the pan member.

3. In a pan conveyor as recited in claim 2, said projectant lugs including apertures for the reception of pins, said pins forming a hinged connection of one pan conveyor construction to another pan conveyor construction to permit said pan conveyor constructions to adjust their positions relatively to each other.

4. In a pan conveyor as recited in claim 3, adjoining ends of the base members, wall members and pan members of connected pan conveyor constructions being spaced from each other to provide freedom of movement of the pan conveyor constructions relatively to each other.

5. A pan conveyor section comprising, a rigid base plate frame member for supporting the conveyor section on a supporting surface and having a substantially planar section that is coextensive with the pan conveyor section and bears on the supporting surface, separate upright wall plate members secured to said base plate member and laterally spaced one from the other, a pan plate member having a longitudinally extending bed and opposite sides extending upwardly from the bed for the conveying run of an endless conveying device, said pan plate member being secured to the tops of the upright wall plate members, said bed of the pan plate member being disposed across the tops of said upright wall plate members, and said base plate frame member including said substantially planar portion thereof, said separate upright wall plate members and said bed of the pan plate member being secured together in the conveyor construction and forming a longitudinally extending compartment for the return run of an endless conveying device, said base plate member having side portions thereof extending laterally beyond the upright wall plate members at the opposite sides of the conveyor section, said opposite sides of the pan plate member extending laterally beyond said upright wall plate members at the opposite sides of the conveyor section, and upright reinforcing plate members secured to said side portions of the base plate member, to the upright wall plate members and to said sides of the pan plate member at spaced positions.

6. A pan conveyor section comprising, a rigid base plate frame member for supporting the conveyor section on a supporting surface and having a substantially planar section that is coextensive with the pan conveyor section and bears on the supporting surface, separate upright wall plate members secured to said base plate member and laterally spaced one from the other, a pan plate member having a longitudinally extending bed and opposite sides extending upwardly from the bed for the conveying run of an endless conveying device, said pan plate member being secured to the tops of the upright wall plate members, said bed of the pan plate member being disposed across the tops of said upright wall plate members, and said base plate frame member including said substantially planar portion thereof, said separate upright wall plate members and said bed of the pan plate member being secured together in the conveyor construction and forming a longitudinally extending compartment for the return run of an endless conveying device, each side of said pan plate member having the edge thereof bent over and downwardly to form a longitudinally extending rail, and a reinforcing strip plate member secured to the underside of said side and edge thereof of the pan plate member.

7. A pan conveyor section comprising, a rigid base plate frame member for supporting the conveyor section on a supporting surface and having a substantially planar section that is coextensive with the pan conveyor section and bears on the supporting surface, separate upright wall plate members secured to said base plate member and laterally spaced one from the other, a pan plate member having a longitudinally extending bed and opposite sides extending upwardly from the bed for the conveying run of an endless conveying device, said pan plate member being secured to the tops of the upright wall plate members, said bed of the pan plate member being disposed across the tops of said upright wall plate members, and said base plate frame member including said substantially planar portion thereof, said separate upright wall plate members and said bed of the pan plate member being secured together in the conveyor construction and forming a longitudinally extending compartment for the return run of an endless conveying device, said base plate member having side portions thereof extending laterally beyond said upright wall plate members at the opposite sides of the conveyor section, said opposite sides of the pan plate member extending laterally beyond said upright wall plate members at the opposite sides of the conveyor section, lugs at each end of the pan conveyor section and projecting beyond the ends thereof for connecting the pan conveyor section to another like pan conveyor section, said lugs being disposed between said base plate member side portions and said pan plate member sides and being secured thereto.

8. A pan conveyor section as recited in claim 7, said lugs having transverse apertures, and at least one pin adapted to be received in said apertures to form a hinged connection of said pan conveyor section to another like pan conveyor section.

9. A pan conveyor section as recited in claim 8, in which said like pan conveyor sections that are connected to each other have end portions thereof spaced from each other to permit one of said pan conveyor sections to bend relatively to another of said pan conveyor sections.

10. A pan conveyor section as recited in claim 8, at least one of said lugs including a slot, and said pin including means engageable with said slot when the pin is received in the apertures of the lugs to retain the pin in said apertures.

References Cited by the Examiner

UNITED STATES PATENTS 2,633,230  3/1953  Duncan _____ 198—204

EVON C. BLUNK, *Primary Examiner.*

WILLIAM B. LABORDE, R. E. AEGERTER,
*Examiners.*